United States Patent
Foti et al.

(10) Patent No.: US 8,079,042 B2
(45) Date of Patent: Dec. 13, 2011

(54) DYNAMIC IPTV GROUP PROFILE CREATION AND MANAGEMENT

(75) Inventors: George Foti, Dollard-des-Ormeaux, CA (US); Nilo Mitra, New York, NY (US); Paul Higgs, Roswell, GA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 536 days.

(21) Appl. No.: 12/259,689

(22) Filed: Oct. 28, 2008

(65) Prior Publication Data
US 2010/0107204 A1    Apr. 29, 2010

(51) Int. Cl.
*H04N 60/32*    (2006.01)
*H04N 7/16*    (2011.01)

(52) U.S. Cl. .................... 725/14; 725/12; 725/25

(58) Field of Classification Search ............. 725/9–21, 725/25–31; 348/734
See application file for complete search history.

(56) References Cited

U.S. PATENT DOCUMENTS
6,359,661 B1 * 3/2002 Nickum ............... 348/734

OTHER PUBLICATIONS
ETSI TS 182 027 V.2.0.0, Telecommunications and Internet converged Services and Protocols for Advanced Networking (TISPAN); IPTV Architecture; IPTV functions supported by the IMS subsystem, Feb. 2008.

* cited by examiner

*Primary Examiner* — Hunter Lonsberry

(57) ABSTRACT

An IPTV group profile is dynamically generated based on individual IPTV user profiles, whenever a user joins or leaves a shared IPTV session at an IPTV Terminal Function (ITF). The IPTV group profile may be implemented as a modification to the IPTV user profile of each user. In one embodiment, a "group" branch includes the additional access privileges and/or restrictions from the IPTV user profiles of other group members. The modified IPTV user profiles of users in the group are placed on a network entity such as an XDM Server (XDMS), to which the ITF subscribes via XCAP. As users join or leave a shared IPTV session at an ITF, the IPTV-AS updates the IPTV user profiles on the XDMS, which notifies the ITF of the changes. Each user's IPTV user profile at the ITF thus reflects group access privileges, preferences and restrictions for the duration of the shared IPTV session.

17 Claims, 4 Drawing Sheets

US 8,079,042 B2

DYNAMIC IPTV GROUP PROFILE CREATION AND MANAGEMENT

FIELD OF THE INVENTION

The present invention relates generally to IP Television (IPTV) systems, and in particular to a system and method of dynamic IPTV group profile generation and management.

BACKGROUND

IPTV (Internet Protocol Television) is a system where a digital television service is delivered using Internet Protocol over a network infrastructure, such as IP Multimedia Service (IMS), in lieu of traditional broadcast or cable delivery. One implementation of IPTV over IMS is defined in the European Telecommunications Standards Institute (ETSI) document ETSI TS 182 027 V2.0.0 (February 2008), titled "Telecommunications and Internet converged Services and Protocols for Advanced Networking (TISPAN); IPTV Architecture; IPTV functions supported by the IMS subsystem," incorporated herein by reference in its entirety. Section 7.3.1 of this document defines the IPTV user profile. An IPTV user profile includes information on Linear TV and Content on Demand services to which a user is subscribed, technical data such as characteristic of the user's IP Terminal Function (ITF) and supported quality definition (e.g., high definition), parental controls, Personal Video Recorder (PVR) information, language preferences, and other data. An IPTV user profile may include personal information such as hobbies and interests, which may for example be used to tailor advertising directed to the user.

An IP Terminal Function (ITF) is a device capable of rendering television content to one or more users, and interacting with at least an IMS network. An ITF may comprise, for example, a "set-top box," having a network interface and outputting video and audio to a television monitor. As another example, an ITF may comprise a television including integral network interface circuits. When a user registers at an ITF, an IPTV Application Server (IPTV-AS) retrieves an IPTV user profile associated with the user from a Home Subscriber Server (HSS), and provides the IPTV user profile to the ITF. The ITF then implements access privileges and restrictions based on the IPTV user profile, such as allowing access to subscribed premium channels, blocking access to non-subscribed or restricted (e.g., adult) channels, and the like. The IPTV user profile may additionally include information, such as past viewing habits, hobbies, and the like, that further personalize the IPTV experience for the user.

Individuals often enjoy watching television together. Two or more users, each subscribing to IPTV services from the same IPTV Service Provider, may wish to access IPTV content over the same ITF. In conventional IPTV systems, the two users would have to register through the ITF in the alternative—that is, either one user or the other being registered at a time. This may be inconvenient. For example, if Bob's IPTV user profile includes access to live sporting events, and Alice's IPTV user profile includes access to a premium movie channel, for Bob and Alice to watch television together, switching between a game and a movie, would require them alternately registering and un-registering through the ITF, to access the different types of content.

SUMMARY

According to one or more embodiments of the present invention, an IPTV group profile is dynamically generated, based on the individual IPTV user profiles of the users within the group, if the users all have the same IPTV Service Provider, whenever a user joins or leaves a shared IPTV session where multiple users are registered at a given IPTV Terminal Function (ITF). The IPTV group profile, which is a profile representing the privileges, restrictions, and preferences of all users in the shared IPTV session, may be implemented as a modification to the individual IPTV user profile of each user in the group. The information in a user profile is preferably maintained as an XML document, with a separate document for each service to which the user is subscribed, such as IPTV. Within each service-specific document, there is a branch for each user under which the profile information specific to that user is maintained. In one embodiment, a "group" branch, created by and accessible only to an IPTV Application Server (IPTV-AS), includes the additional access privileges and/or restrictions from the IPTV user profiles of other group members. The IPTV user profile can contain multiple group branches, each corresponding to the user's participation in a separate, shared IPTV session. The modified IPTV user profiles of users in the group are placed on a network entity, such as for example an XDM Server (XDMS), to which the ITF subscribes, using XCAP Users, via their ITFs, can subscribe to receive notifications of any changes to their profile. As users join or leave a group (i.e., a shared IPTV session at an ITF), the IPTV-AS updates the IPTV user profiles on a network server that stores user profiles, e.g. XDMS, which notifies the ITF of the changes. Each user's IPTV user profile at the ITF thus reflects group access privileges and restrictions for the duration of the shared IPTV session.

One embodiment relates to a method of managing user profiles for multiple ITF users by an IPTV-AS. A first IPTV user profile is obtained for a first user registered at an ITF. When a second user registration at the ITF is detected, the IPTV user profile for the second user is obtained. An IPTV group profile is generated from both these user profiles using some algorithm, which represents a profile appropriate for both the first and second user when sharing an IPTV session at the ITF. This IPTV group profile is provided to the ITF.

DETAILED DESCRIPTION

According to embodiments of the present invention, an IPTV Application Server (IPTV-AS) detects multiple users registered at an ITF (all using the same IPTV Service Provider), and generates an IPTV group profile having privileges and restrictions appropriate for all of the registered users. The IPTV group profile is provided to the ITF, which then renders content for the multiple users. In general, the IPTV group profile is dynamically created for a particular group of users, and is in effect only for the duration that those users are registered through the ITF. If one or more users un-registers from the ITF, the IPTV group profile is discarded, and a new IPTV group profile is generated based on the individual IPTV user profiles of the remaining registered users.

Figure 1:
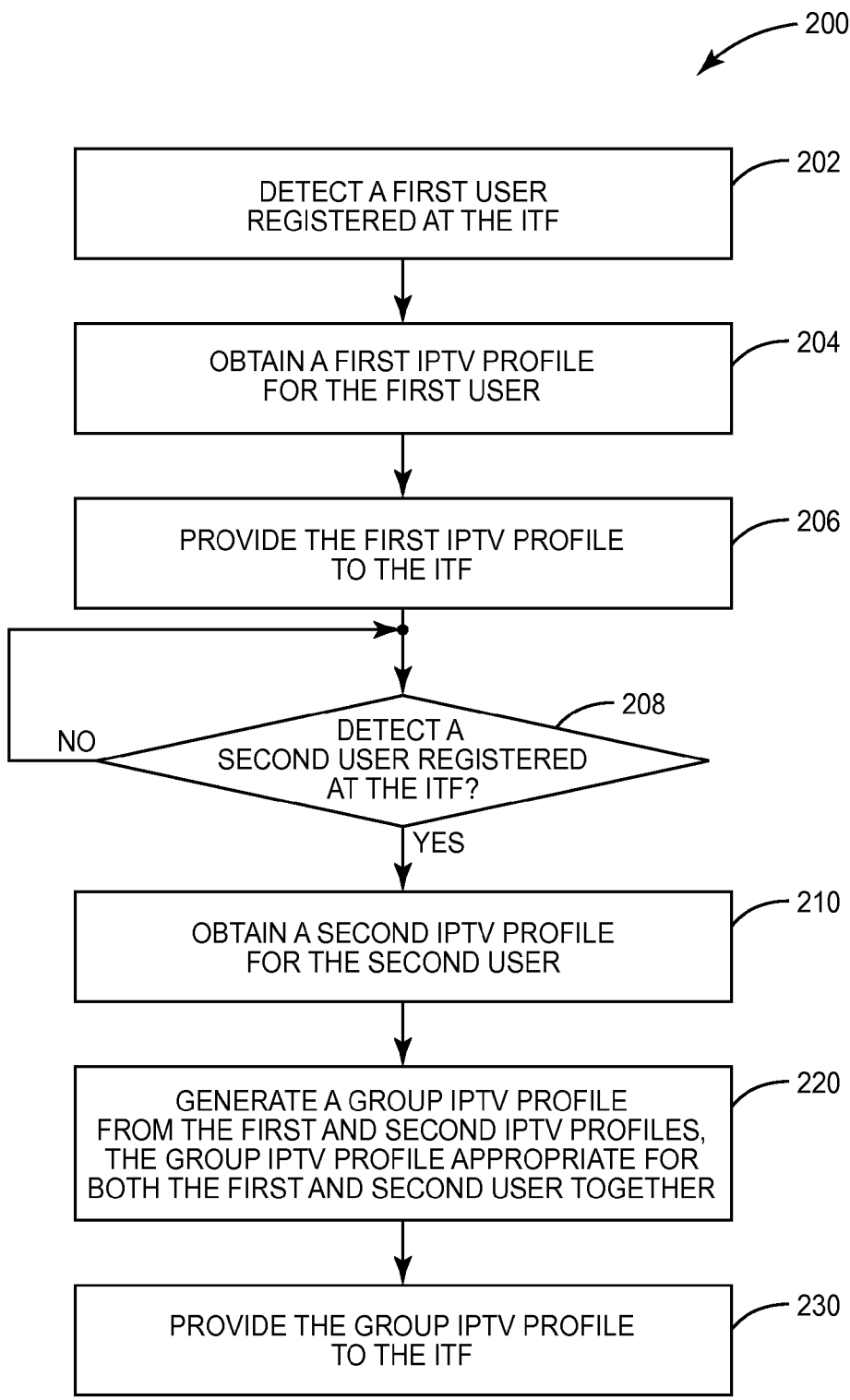
FIG. 1 is a flow diagram of a method of generating an IPTV group profile.

A method 200 of managing user profiles for multiple ITF users by an IPTV-AS is depicted in FIG. 1. The IPTV-AS detects a first user registered at the ITF (block 202). The IPTV-AS obtains a first IPTV user profile associated with the first user (block 204), such as from an HSS, and provides the first IPTV user profile to the ITF (block 206).

The IPTV-AS later detects a second user registered at the ITF (block 208), and obtains a second IPTV user profile associated with the second user (block 210). The IPTV-AS detects the new user by comparing information in the incoming third party registration (or de-registration, when a user leaves the ITF) from a given ITF against already registered users at that ITF. The IPTV-AS ascertains whether all the users belong to a pre-provisioned group (such as a family) or if a dynamic group needs to be created from the IPTV user profiles of the registered users.

If it determines that a new IPTV group profile is necessary, the IPTV-AS generates an IPTV group profile appropriate for both users, from the first and second IPTV user profiles (block 220). To create the IPTV group profile, the IPTV-AS implements one or more IPTV group profile creation policies. These policies may be service specific. In the case of linear TV, for example, the IPTV group profile creation policy may stipulate that when determining the allowed channels, all channels belonging to different profiles will be collectively offered, if appropriate to all users. For example, adult channels may be filtered from the IPTV group profile if one or more of the first and second users are a child. This allows the two (or more) users to watch all of the channels collectively authorized, while respecting the constraints of each profile. The ITF must be aware of the correct "group" branch in the individual IPTV user profiles, choosing one from possibly multiple group branches in the profile based on the identity of the registered users at that ITF or other criteria, so that it can use this information to apply the IPTV group profile to be used during the multi-user session from that ITF.

In some cases, IPTV group profiles may be pre-provisioned. One example of such a pre-provisioned group is that of a family, where one IPTV group profile could include all family members in the subscription, and the IPTV group profile is constrained to respect the constraints imposed by the different individual IPTV user profiles (e.g., the allowed ratings for each member). It is also possible to define multiple pre-defined groups for a family, such as parents only, minor children only, parents with adult children, and the like. Users who share the same IMS Private Identity (IMPI) for the IPTV subscription, which is typically the case for all members in a household, are treated as belonging to one of these groups for profile management purposes. It is one of these IPTV group profiles that will be in effect when multiple users from the same subscription (i.e., the same IMPI) are registered simultaneously on the same ITF.

For users who don't share the same IMPI, a group must be created dynamically and maintained in the IPTV-AS for a particular session from an ITF with multiple registered users. The group would include the IMS Public Identity (IMPU) for those users.

The information in a user profile is maintained as an XML document, with a separate document for each service, such as IPTV. Within each service-specific document, there is a branch for each user under which the information specific for that user is maintained. In one embodiment, the IPTV-AS creates a separate "group" branch in each user's IPTV user profile document, where it stores the IPTV group profile. The IPTV-AS has read/write access to this branch, and is not accessible to other applications. This branch is on a per-service basis. The IPTV group profile is deleted from this branch when the user de-registers from the ITF. If the IPTV group profile changes, the new IPTV group profile is stored here.

When an IPTV user registers at an ITF, the IMS network sends a third party registration to the IPTV-AS to notify the IPTV-AS of that event. In addition, the ITF subscribes to a network entity that holds the IPTV user profiles, to be notified of any changes to the profile of the registered user. In one embodiment, this network entity may be an IPTV XDM Server having an XCAP interface. XCAP is a well-known protocol for accessing and manipulating XML documents, such as a document representing a user's IPTV profile. Accordingly, when the IPTV-AS adds or modifies the branch containing the IPTV group profile, a notification, and the new profile, are sent to the ITF, which can then adjust the viewing experience to that governed by the IPTV group profile. In this manner, the IPTV-AS provides the IPTV group profile to the ITF (block 214).

The IPTV-AS does not update the HSS with changes made to the "group" branch of a user's IPTV user profile. Changes to the "group" branch are considered temporary—that is, only for the duration of the concurrent user registrations at an ITF—and should not change the user's permanent IPTV user profile in the HSS. This allows the user to register from another ITF and have the IPTV-AS retrieve the correct and up-to-date IPTV user profile from the HSS. Of course, any changes made by the user to his IPTV user profile on the XDMS (using XCAP) are uploaded to the HSS, but note that these are changes to allowed portions of the profile—and not the "group" branch—which is under the exclusive control of the IPTV-AS.

The IPTV-AS retains a copy of the most current IPTV user profile of each user, using standard techniques known in the art. This ensures that when a user de-registers, the IPTV-AS can then generate a new IPTV group profile for the remaining users, and perform the necessary update on the ITF. For example, assume users A and B both register at an ITF. The IPTV-AS creates a new IPTV group profile, for example merging the access privileges of users A and B. New user C then joins by also registering at the same ITF. The IPTV-AS discards the previous IPTV group profile, overwriting it with a newly created IPTV group profile that reflects the access privileges of users A, B, and C. As discussed above, this may be implemented by writing the new IPTV group profile to the "group" branch of A's, B's, and C's IPTV user profiles, e.g., on the XDMS, to which the ITF is subscribed, to receive notice of any changes thereto.

Assume user B then leaves the group television watching session, by de-registering at the ITF. The IPTV-AS then creates yet another IPTV group profile, this time reflecting the privileges of users A and C. The IPTV-AS may thus continue to dynamically create new IPTV profiles for the currently-registered users at an ITF, from the individual IPTV user profiles it obtains as each user first registers, and a copy of which the IPTV-AS retains until the user de-registers. In some embodiments, some of these IPTV group profiles may be saved by the IPTV-AS, at the direction of users, or following a recognized usage pattern. Of course, in this example, if user C then leaves by de-registering at the ITF, the IPTV-AS will provide user A's individual IPTV user profile to the ITF (e.g., by erasing the "group" branch from it on the XDMS).

Figure 2:
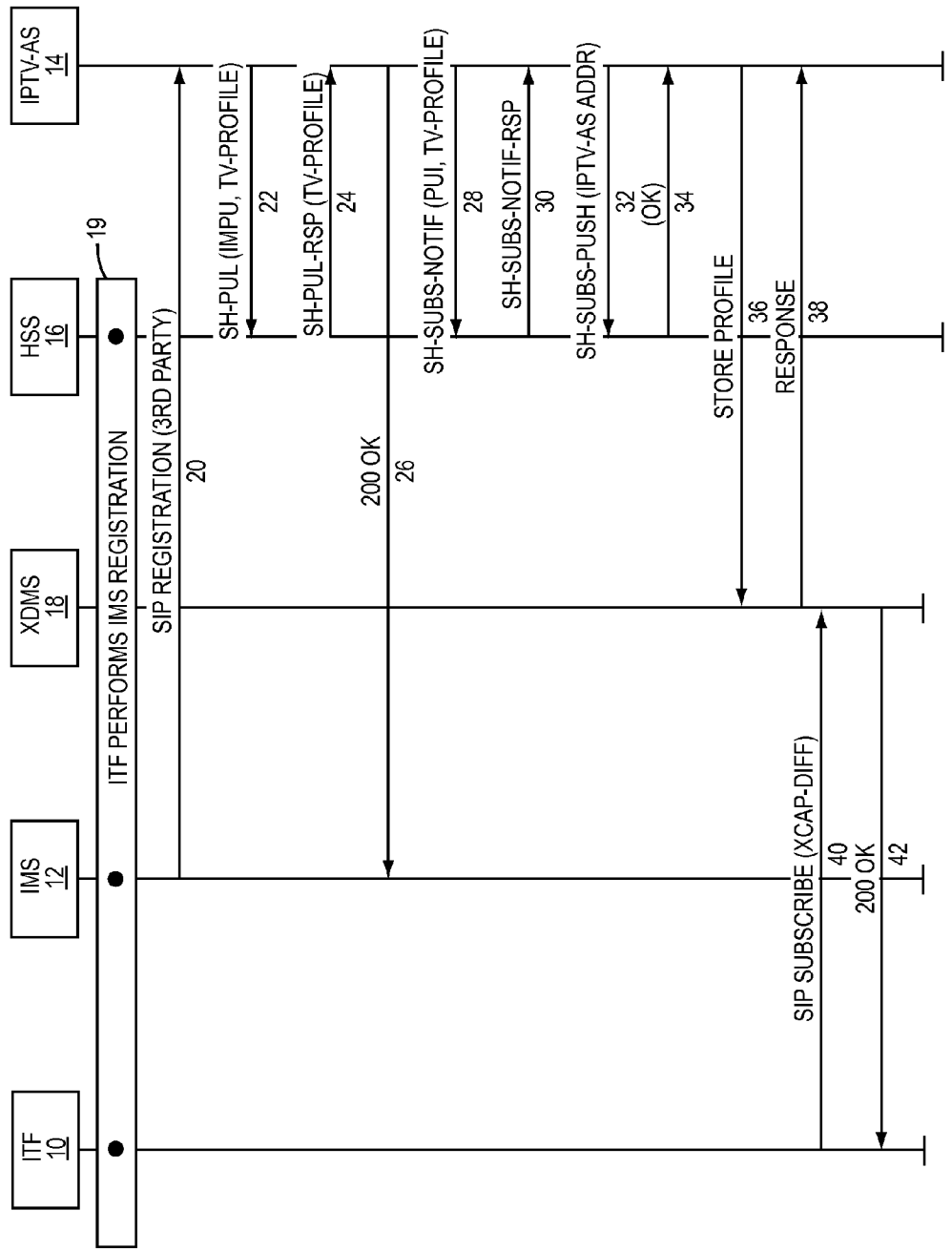
FIG. 2 is a network signaling diagram of a method of registering a user in an IPTV session.

FIG. 2 depicts the network signaling implementing a user IPTV registration according to an embodiment of the present invention. FIG. 2 depicts known standard SIP and Sh messages between an ITF 10, the IMS network 12, an IPTV-AS 14, an HSS 16, and an XDMS 18. When a user registers at the ITF 10, the user is registered with the IMS network (step 19), involving the ITF 10, IMS 12, and HSS 16, as indicated by the dots, and subsequently with the IPTV-AS 14 (step 20). This procedure is well known in the art, and not explained further. The IPTV-AS 14 then reads the IPTV user profile for the user from the HSS 16, using the standard Sh interface (steps 22, 24). The IPTV-AS 14 then acknowledges the 3$^{rd}$ party registration with a SIP 200 OK message (step 26). The IPTV-AS 14 subscribes through the standard Sh interface to the HSS 16, to be notified of any changes to the profile (steps 28, 30). This ensures that the IPTV-AS 14 has the latest IPTV user profile for the user so that it can perform all necessary updates or restoration. The IPTV-AS 14 then updates the HSS 16 with its address (steps 32, 34), so that if any other IMPU registers, they will be allocated by the HSS to the same IPTV-AS 14.

In one embodiment, IPTV-AS 14 next stores the retrieved IPTV user profile in an XDMS 18 that has an XCAP interface (steps 36, 38). The XDMS 18 allows other entities in the network (as well as the user, via the ITF 10) to read or modify the profile using XCAP. The XDMS 18 may be implemented in the same physical device as the IPTV-AS 14. Accordingly, a generic signaling is depicted in steps 36 and 38, between the IPTV-AS 14 and the XDMS 18, for loading the IPTV user profile retrieved from the HSS 16. Note that the XDMS 18 additionally supports an XCAP interface for access by other entities.

The HSS 16 is the persistent storage for the IPTV user profile. Typically, the HSS 16 is updated by the XDMS 18 using the standard Sh interface whenever the IPTV user profile changes. However, according to embodiments of the present invention, the HSS 16 is not updated when the "group" branch of a user's IPTV user profile is updated, since this change is considered temporary and only affects the user's current session from a particular ITF 10. Finally, the ITF subscribes to the XDMS 18 (step 40) to be notified of any changes in the user's profile, as indicated by the event package xcap-diff. In the standard technique, the entire user profile is downloaded in the initial response (step 42) to the subscription request. Subsequent notifications may only return differences from this complete profile. Note that in other embodiments, the temporary IPTV group profile (i.e., the IPTV user profiles with modified "group" branch) may be stored on a network entity other than an XDMS 18, so long as the ITF 10 can subscribe to the network entity to be notified when the IPTV user profiles are modified.

Figure 3:
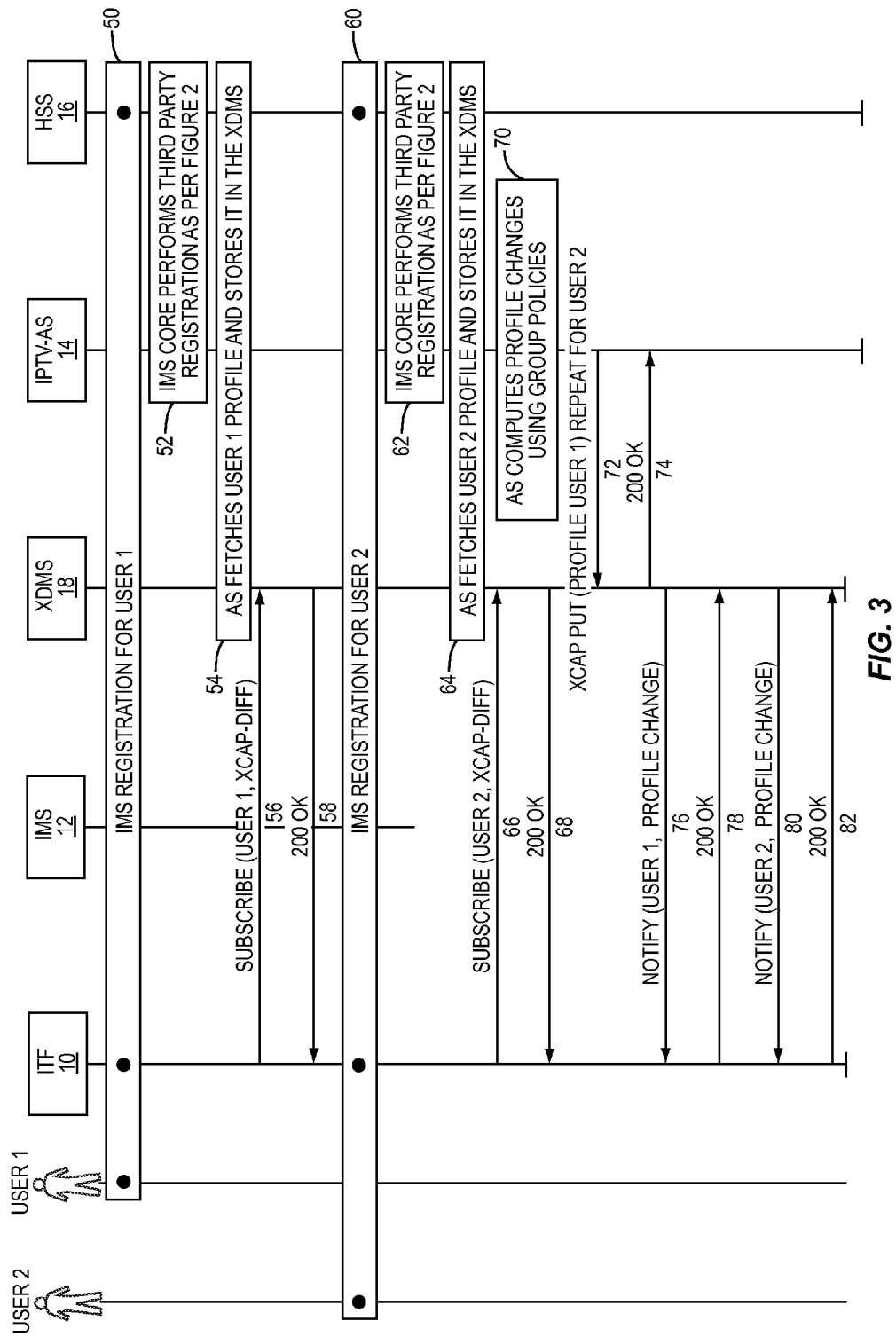
FIG. 3 is a network signaling diagram of a method of creating and providing an IPTV group profile for two users.

FIG. 3 depicts the network signaling for two users simultaneously registered at an ITF 10. The first user performs an IMS registration (step 50) and the IMS performs a 3$^{rd}$ party registration of user 1 to the IPTV-AS 14 (step 52), as described above with reference to FIG. 2. The IPTV-AS 14 retrieves the IPTV user profile for user 1 and stores it in the XDMS 18 (step 54), as also described above. The ITF 10 then subscribes to the XDMS 18 (steps 56, 58), to be notified of any changes in the IPTV user profile of user 1, using the event package xcap-diff.

User 2 then joins user 1 by registering at the ITF 10 (step 60). The IMS registers user 2 with the IPTV-AS 14 (step 62), which obtains the IPTV user profile for user 2 and stores it in the XDMS 18 (step 64). The ITF 10 then subscribes to the XDMS 18 (steps 66, 68), to be notified of any changes in the IPTV user profile of user 2. The IPTV-AS 14 then computes an IPTV group profile appropriate for both user 1 and user 2 (step 70). The IPTV-AS 14 implements the IPTV group profile by altering the (group) branch of the IPTV user profile for user 1, and writes the modified IPTV user profile to the XDMS 18 (step 72, 74). The IPTV-AS 14 similarly modifies the IPTV user profile for user 2 on the XDMS 18. Since the ITF 10 previously subscribes to the XDMS 18 (step 66, 68) the XDMS 18 notifies the ITF 10 of the changes to the IPTV user profile of user 1 (steps 76, 78) and user 2 (steps 80, 82). The new IPTV user profile for each user, including the additional privileges or restrictions in its "group" branch, is in effect at the ITF 10 for the duration of the shared session of user 1 and user 2.

Figure 4:
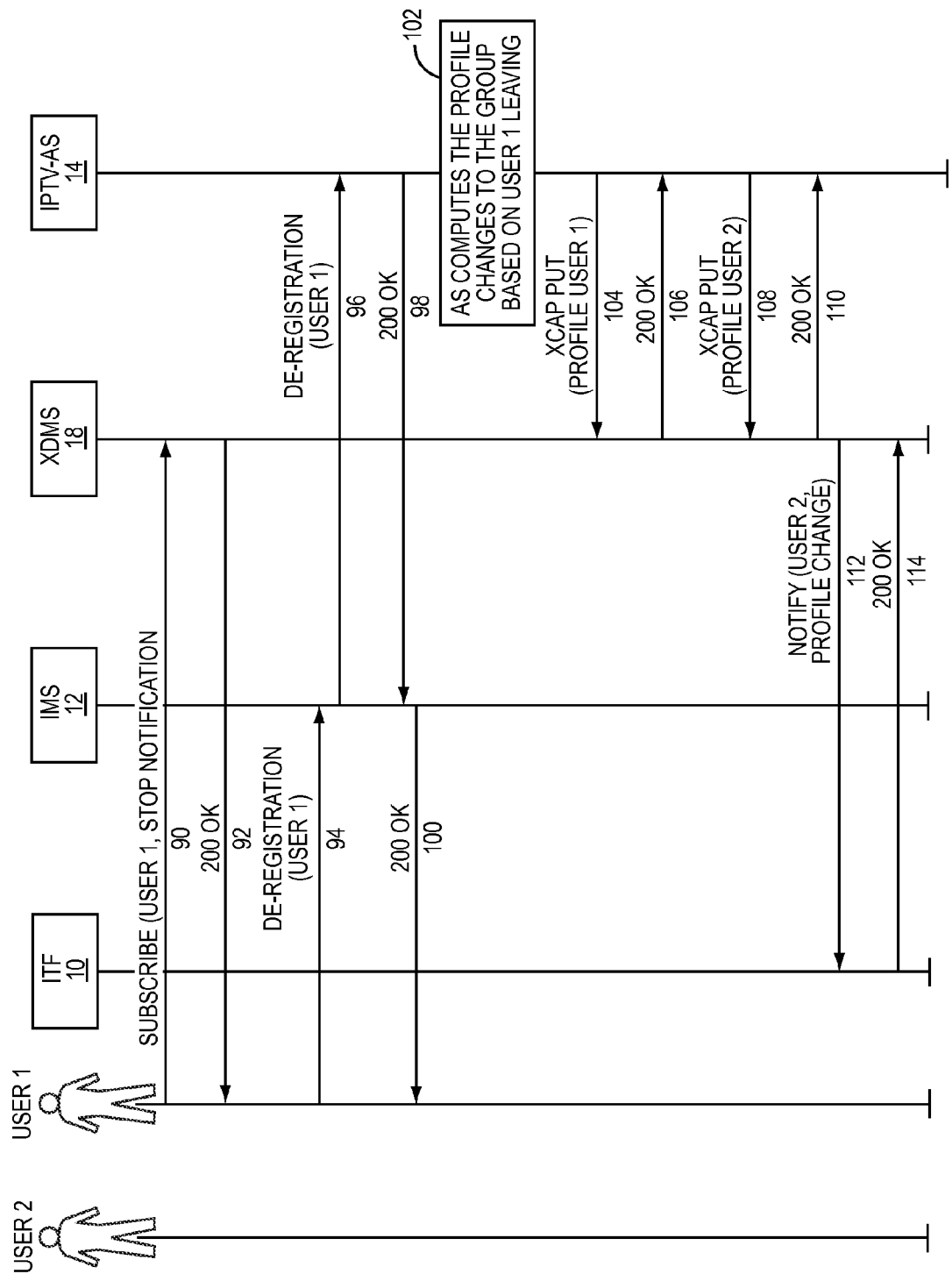
FIG. 4 is a network signaling diagram of a method of altering an IPTV group profile when a user leaves the group.

FIG. 4 depicts the network signaling when user 1 logs out of the shared IPTV session. Assume the network is in the state after steps 80, 82 of FIG. 3. User 1 logs out at the ITF 10, prompting it to terminate the subscription to the XDMS 18 (step 90, 92). User 1 then de-registers to the IMS 12 (step 94), which forwards the de-register message to the IPTV-AS 14 (step 96). Acknowledgments propagate in the reverse direction (steps 98, 100). The IPTV-AS 14 then computes changes to the IPTV group profile (step 102), based on its knowledge of user 1 leaving the IPTV session. In this example, the IPTV group profile will be discarded as only one user remains registered at the ITF 10, and the group branch of the IPTV user profile for user 2 will be deleted. If more users comprised the shared IPTV session, the new IPTV group profile would be computed based on the individual IPTV user profiles of the remaining registered users. The IPTV-AS 14 updates the XDMS 18 with the modified IPTV user profiles of user 1 (steps 104, 106) and user 2 (steps 108, 110)—in this example, by deleting the "group" branch of each. The XDMS propagates the changes to the profile of user 2 to the ITF 10 (steps 112, 114) pursuant to the subscription.

Embodiments of the present invention provide for the provision, and dynamic modification, of IPTV group profiles that promulgate access privileges and/or restrictions from one or more individual user IPTV user profiles to the IPTV user profiles of other users in a concurrent registration at the same ITF. The method is scalable, creating a new IPTV group profile as each individual user joins or leaves the group. In appropriate circumstances, IPTV group profiles may be pre-provisioned and stored for use by predefined groups.

In one or more embodiments, the concept of an IPTV group profile is implemented as modifications to the individual IPTV user profile of each user in the group, such as by adding a "group" branch to the IPTV user profile. Accordingly, in these embodiments, reference to an IPTV group profile is understood to be the cumulative modifications to the individual IPTV user profiles within the group. Those of skill in the art know that an ITF may comprise a "set-top box" having a network connection and video and audio outputs, or a television having network interface circuits and operative to render television output directly. As used herein, the term outputting television content means either outputting video and audio that another device may render, or directly rendering the television content to users.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of managing user profiles for multiple IPTV Terminal Function (ITF) users by an IPTV Application Server, comprising:

obtaining a first IPTV user profile for a first user registered at an ITF;

detecting a second user registered at the ITF;

obtaining a second IPTV user profile for the second user;

generating a first IPTV group profile from the first and second IPTV user profiles, the first IPTV group profile appropriate for both the first and second user together; and providing the first IPTV group profile to the ITF by storing the group profile on an XDM server to which the ITF is subscribed for notifications.

2. The method of claim 1 wherein both the first and second user subscribe to the same IPTV Service Provider.

3. The method of claim 1 wherein generating a first IPTV group profile from the first and second IPTV user profiles comprises generating a first IPTV group profile from the first and second IPTV user profiles according to one or more IPTV group profile generation policies.

4. The method of claim 3 wherein generating a first IPTV group profile from the first and second IPTV user profiles comprises expanding the first IPTV user profile to include access privileges in the second IPTV user profile.

5. The method of claim 3 wherein generating a first IPTV group profile from the first and second IPTV user profiles comprises restricting the first IPTV user profile to include access restrictions in the second IPTV user profile.

6. The method of claim 1 wherein generating a first IPTV group profile from the first and second IPTV user profiles comprises modifying a group branch of each of the first and second IPTV user profiles.

7. The method of claim 1 further comprising detecting either the first or second user has de-registered from the ITF.

8. The method of claim 7 further comprising replacing the first IPTV group profile with the IPTV user profile associated with the remaining registered user.

9. The method of claim 1 further comprising:
detecting a third user registered at the ITF;
obtaining a third IPTV user profile for the third user;
generating a second IPTV group profile from the first, second, and third IPTV user profiles, the second IPTV group profile appropriate for the first, second, and third users together; and
providing the second IPTV group profile to the ITF.

10. The method of claim 9 further comprising:
detecting either the first or third user has de-registered from the ITF;
generating a third IPTV group profile from the second IPTV user profiles and the IPTV user profile associated with the remaining registered user, the third IPTV group profile appropriate for the second and remaining registered users together; and
providing the third IPTV group profile to the ITF.

11. An IPTV Terminal Function supporting shared IPTV sessions, comprising:
a network interface;
television interface for outputting IPTV content; and
a controller for receiving a plurality of IPTV user profiles for registered users from the network interface and for maintaining the plurality of IPTV user profiles for registered users and for controlling the television interface to selectively output IPTV content in accordance with access privileges and restrictions in at least one of the plurality of IPTV user profiles, for subscribing to notifications
associated with changes to a registered user profiles in the plurality of IPTV user profiles from an XDM server, and for retrieving updated IPTV user profiles to share access privileges and restrictions among concurrently registered users.

12. The IPTV Terminal Function of claim 11 wherein the controller is operative to independently subscribe to the XDM Server for each currently registered user.

13. The IPTV Terminal Function of claim 11 wherein the controller is operative to select an appropriate group branch in the registered user IPTV user profiles from among a plurality of group branches.

14. An IPTV Application Server, comprising a controller operative to:
receive IPTV subscriptions from users at an IPTV Terminal Function (ITF);
obtain an IPTV user profile for each subscribed user;
detect two or more users concurrently subscribed at the same ITF;
generate an IPTV group profile including access privileges and restrictions appropriate to all concurrently subscribed users;
modify at least one of the obtained IPTV user profiles and provide the IPTV group profile and the modified IPTV to the ITF by storing the generated and modified profile on an XDM Server to which the ITF is subscribed for notification of profile modifications.

15. The IPTV Application Server of claim 14 wherein the controller is operative to generate an IPTV group profile by modifying a group branch of the each IPTV user profile.

16. The IPTV Application Server of claim 15 wherein the controller is operative to provide the IPTV group profile to the ITF by storing each modified IPTV user profile on the XDM Server for retrieval by the ITF.

17. IPTV Application Server of claim 14 wherein the controller is operative to retain the IPTV user profile of each concurrently subscribed user.

* * * * *

UNITED STATES PATENT AND TRADEMARK OFFICE
CERTIFICATE OF CORRECTION

Page 1 of 1

PATENT NO. : 8,079,042 B2
APPLICATION NO. : 12/259689
DATED : December 13, 2011
INVENTOR(S) : Foti et al.

It is certified that error appears in the above-identified patent and that said Letters Patent is hereby corrected as shown below:

On the Title Page, in Field (75), under "Inventors", in Column 1, Lines 1-2, delete "Dollard-des-Ormeaux, CA (US);" and insert -- Dollard-des-Ormeaux, CA; --, therefor.

In Column 2, Line 28, delete "e.g." and insert -- e.g., --, therefor.

Signed and Sealed this
Seventeenth Day of April, 2012

David J. Kappos
*Director of the United States Patent and Trademark Office*